Patented Feb. 23, 1954

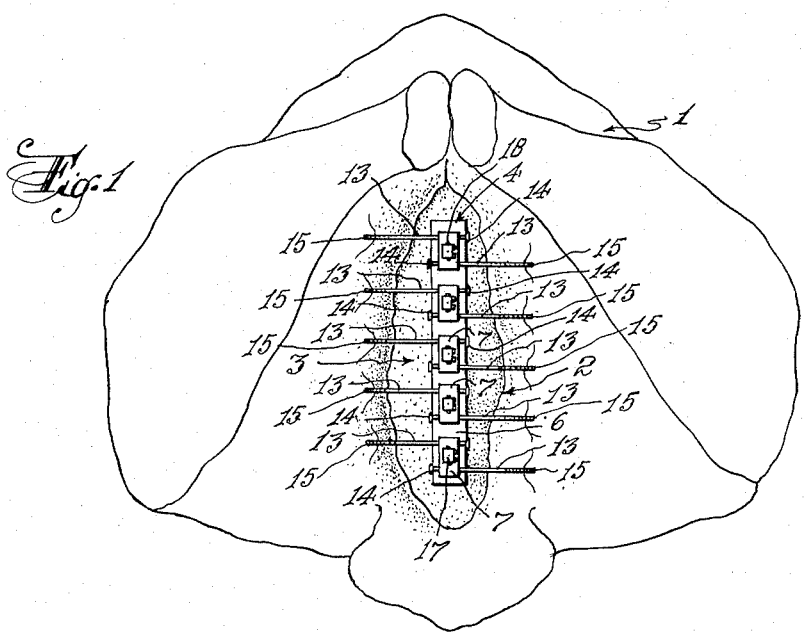
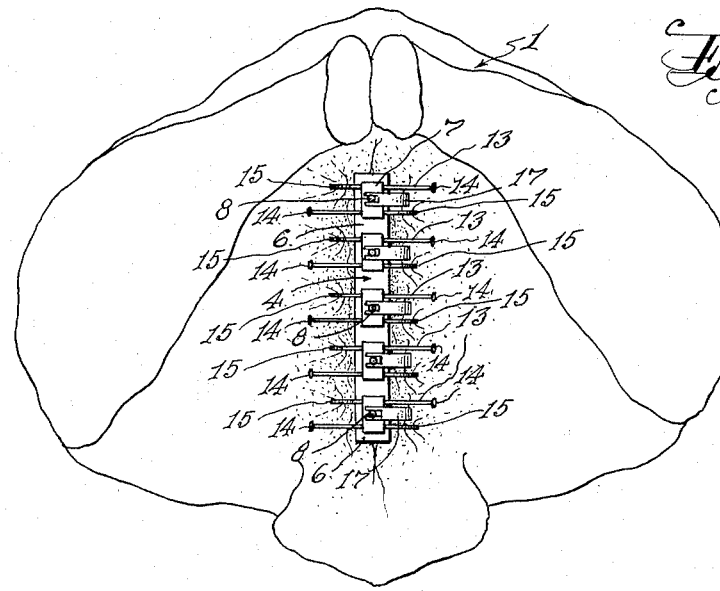
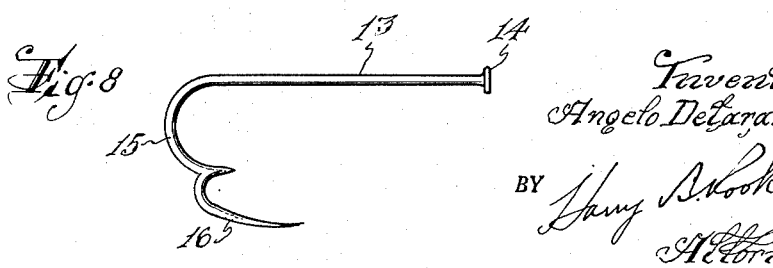

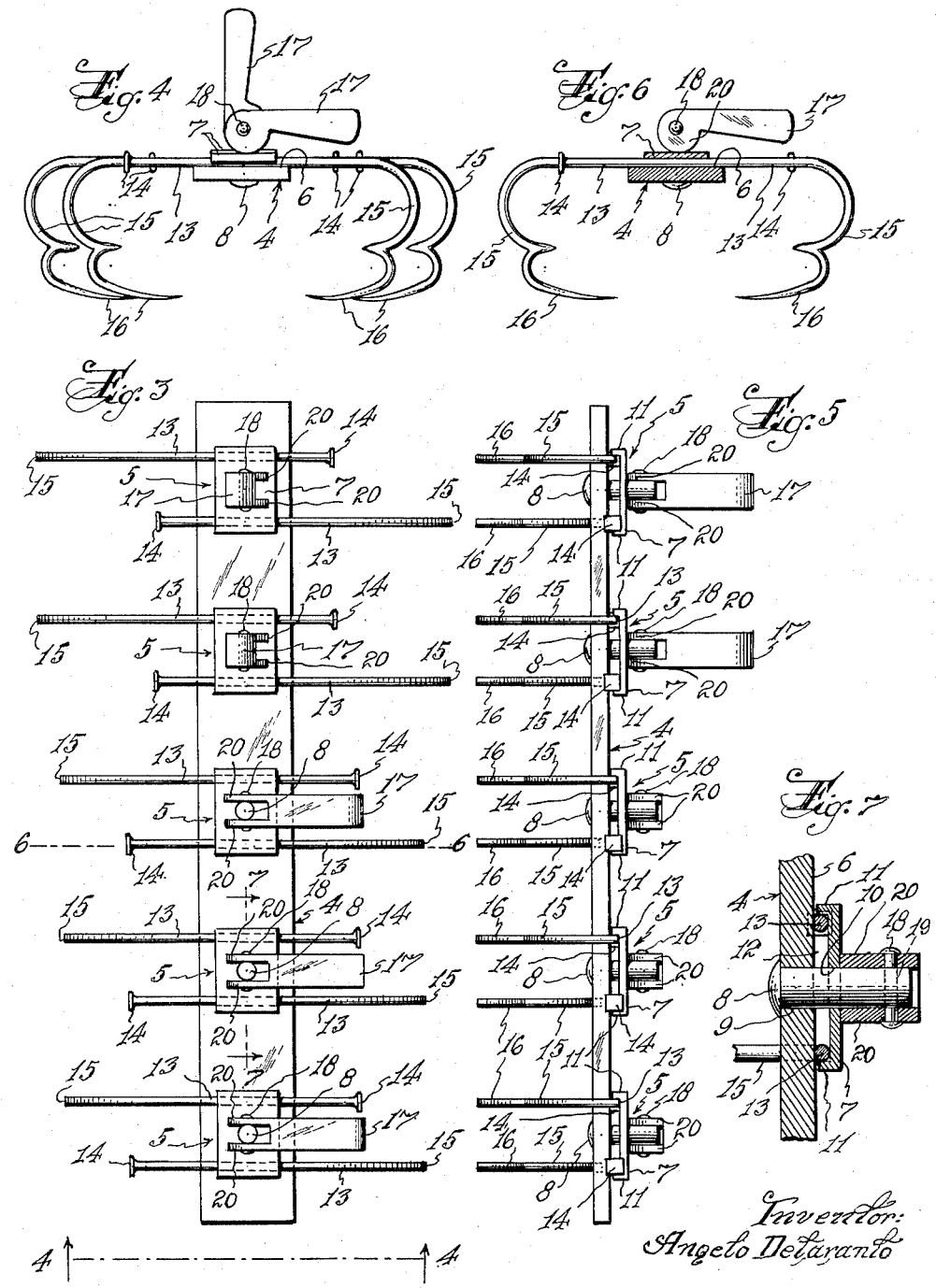

2,669,747

UNITED STATES PATENT OFFICE 2,669,747

DEVICE FOR CLOSING INCISIONS IN FOWLS OR THE LIKE

Angelo J. Detaranto, Madison, N. J.

Application October 9, 1951, Serial No. 250,467

6 Claims. (Cl. 17—11)

1

The invention relates particularly to devices for drawing and holding the edges of cuts or incisions in fowls or the like against separation during the roasting process.

In cooking fowl, roasts or fish or other articles of food of similar character, the flesh is cut to provide an opening to the interior for the insertion of stuffing. After the stuffing has been inserted, it is necessary to close the opening to prevent the stuffing from falling out and to prevent the flesh at the edges of the opening from separating during the roasting. Heretofore, fastening devices such as stitches, pins and skewers have been used for this purpose but these have been unsatisfactory as it takes considerable time and labor to apply them and they are easily misplaced.

It is a prime object of the present invention to overcome these difficulties by providing a novel device for drawing the flesh at the edges of an opening in carcass or the like toward each other and for holding such edges in drawn position during the roasting process.

Another object of the invention is to provide a device of this kind that can be readily applied, shall be adjustable and highly efficient in use, and can be used over and over again.

Another object of the invention is to provide a device of this kind that shall be sanitary, simple in construction and economical to manufacture.

Other objects and advantages of the invention will be apparent from the description thereof to follow taken in connection with the accompanying drawings in which—

Figure 1 is a top plan view of the carcass of a turkey showing an opening cut therein with a device embodying the present invention in position and with the hook members in open position preparatory to closing the opening.

Figure 2 is a similar view but showing the opening closed.

Figure 3 is an enlarged top plan view of the device removed from the carcass.

Figure 4 is an end view of the device looking from the line 4—4 of Figure 3 in the direction of the arrows.

Figure 5 is a side view thereof.

Figure 6 is a cross-sectional view taken on the plane of the line 6—6 of Figure 3.

Figure 7 is a fragmentary sectional view taken on the plane of the line 7—7 of Figure 3 on an enlarged scale.

Figure 8 is a side elevational view of a hook member used with the improved lacing device.

Referring to the drawings, the fastening device or clamp is illustrated as applied to the carcass 1 of a turkey, the flesh of which has been cut or opened as indicated at 2 for the insertion of stuffing 3 as shown in Figure 1. The device comprises an elongated flat metal bar 4 which may be flexible, and a plurality of fastening, holding or clamping assemblies 5 spaced along the top face 6 thereof.

Each assembly consists of a clamping plate 7 slidably supported on the shank portion of a headed pin 8 extending through an opening 9 in the bar and through an aligned opening 10 in the plate, the shank portion protruding outwardly of the plate. The plate is formed with side flanges 11 which extend toward the face 6 of the bar, leaving a space 12 between the plate and bar. Slidably mounted in the space 12 between the plate and bar is a pair of hook members, one hook member of the pair being disposed on each side of the shank of the pin 8 and transversely of the face 6 of the bar, the flanges 11 guiding and holding them in proper position in said space. Each hook member consists of an elongated shank portion 13 slidable on and transversely of said bar 4 with a head 14 at one end and a hook or bill portion 15 at the other end terminating in a pointed end 16. The hook members may also have barbs or projections and are so disposed relatively that their hook portions project beyond opposite longitudinal edges of the bar and are in opposed relation with the points facing each other as shown in Figure 4. A clamping lever 17 is pivotally mounted on a pivot pin 18 which extends transversely through an opening 19 in the protruding portion of the shank of the pin 8. At its pivoted end, the lever is bifurcated and enlarged to form two spaced cams 20, 20 which are adapted to engage the plate 7 and due to the eccentric position of the pin 18 said cams press the plate 7 against the shank portions 13 of the hook members thereby clamping said hook members in any of various positions relative to the bar. The heads 14 of the hook members prevent the hook members from slipping from beneath the plates. It will be understood that the bar 4 may be of any desired length and support any number of clamping assemblies 5. By arranging and mounting the hook members as aforesaid, the pointed ends 16 are always in proper position with reference to the plate and to each other for proper insertion into the flesh.

In use, after the stuffing 3 is inserted through the opening 2, into the carcass of the turkey 1, for example, the bar 4 with the clamping assemblies is placed on the stuffing midway between the edges of the opening as shown in Figure 1.

The cam levers are swung so that the hook members are loosely held between the clamping plates 7 and the bar 4. The pointed ends 16 of the hook members are forced into the flesh of the carcass adjacent the side edges of the opening 2 so that the hooked portions 15 of the respective pairs of hook members are caused to penetrate the flesh of the edges of the opening in opposed relation. For best results, the hook members are fastened in succession from one end of the bar to the other. When the loose hook members are completely hooked into the flesh in the loose position of Figure 1, the hooked portions 15 of each assembly or pair are drawn toward each other as by pulling on the heads 14 of such hook members in opposite directions transversely of the bar or by pushing the hook portions so that the edges of the opening 2 are pulled into engagement with each other. The corresponding lever 17 is then turned on its pivot pin 18, bringing the cam 20, 20 forcibly against the plate 7 and pressing said plate against the shank portions 13 of the hook members, thereby clamping said hook members in adjusted position between the bar and said plate. When all of the hook members are thus drawn toward each other and clamped as shown in Figure 2, the opening 2 is completely closed thereby preventing accidental falling out of the stuffing and also preventing separation of the flesh during the roasting process.

When the turkey or roast or other article of food has been roasted and is ready for serving, the device can readily be removed by turning the levers 17 to release the pressure of the plates 7 on the hook members whereupon the hooked portions 15 of the hook members may be withdrawn from the flesh of the carcass, and the entire device removed.

The bar 4 and clamping assemblies 5 are made of any suitable non-corrosive metal which will not contaminate the food and which can readily be cleaned and used over and over again.

It will also be understood that the bar 4 will be substantially the length of the cut or opening 2 and that the holding hook members will be of sufficient length to bridge the cut or opening and at the same time allow the hook portions to be set a sufficient distance from the cut or opening to prevent them from displacement by reason of any expansion or contraction or changed condition of the flesh while roasting.

Changes in details of construction might be made and parts of the device used without other parts without departing from the principles of the invention.

What I claim is:

1. A device for closing the incision in the carcass of a fowl or the like comprising a bar to overlie the incision, at least one clamping assembly mounted thereon, said assembly including two hook members which project beyond opposite longitudinal edges of the bar in opposed relation to each other for insertion into the flesh of a carcass along the adjacent edges of an incision therein, said hook members being independently adjustable relatively to the bar and to each other, and means for clamping said hook members in adjusted positions.

2. A device for closing the incision in the carcass of a fowl or the like comprising a bar, at least one clamping assembly mounted thereon, said assembly comprising two hook members each including a straight shank slidable on and transversely of said bar and having a hook portion at one end for insertion into the flesh of a carcass adjacent one edge of an incision in the carcass, said hook portions projecting from opposite longitudinal edges of said bar in opposed relation to each other, and means for simultaneously clamping said shanks of both hook members in adjusted position.

3. A device for closing the incision in the carcass of a fowl or the like as defined in claim 1 wherein said means for clamping said hook members includes a cam lever pivotally mounted on said bar.

4. A device for closing the incision in the carcass of a fowl or the like as defined in claim 2 wherein said means for simultaneously clamping the shanks of said hook members includes a clamping plate overlying said shanks in opposed relation to said bar, and a cam clamping lever for forcing said clamping plate toward said bar into engagement with said shanks to clamp said shanks between said clamping plate and said bar.

5. A device for closing the incision in the carcass of a fowl or the like as defined in claim 4 wherein said bar has a transverse opening and with the addition of a pin loosely slidable in said opening with a head at one end to abut one side of said bar, and means for pivotally connecting said cam clamping lever to said pin adjacent the other end thereof.

6. A device for closing incisions in a stuffed fowl or the like comprising a bar to overlie the incision, a plurality of clamping assemblies mounted on said bar in spaced relation longitudinally thereof, each assembly including a pair of hook members which project beyond opposite longitudinal edges of the bar in opposed relation to each other for insertion into the flesh of the fowl along the adjacent edges of an incision in the body of the fowl, said hook members being independently adjustable relatively to the bar and to each other, and means for clamping the hook members of each pair in adjusted position independently of the hook members of the other pairs.

ANGELO J. DETARANTO.

References Cited in the file of this patent
UNITED STATES PATENTS

| Number | Name | Date |
|---|---|---|
| 499,356 | Friedberger | June 13, 1893 |
| 1,460,998 | Zangrilli | July 3, 1923 |
| 1,510,253 | Crnoev | Sept. 30, 1924 |
| 1,749,330 | Engh | Mar. 4, 1930 |
| 2,516,359 | Zoller | July 25, 1950 |
| 2,583,913 | Weiterschan | Jan. 29, 1952 |